(12) United States Patent
Oh et al.

(10) Patent No.: US 6,812,985 B1
(45) Date of Patent: Nov. 2, 2004

(54) LIQUID CRYSTAL DISPLAY DEVICE

(75) Inventors: Young Jin Oh, Kyungki-do (KR); Kyoung Nam Lim, Seoul (KR); Dong Hyo Gu, Kyungki-do (KR); Sang Ho Lee, Kyungki-do (KR); Min Cheol Shin, Incheon (KR)

(73) Assignee: LG.Philips LCD Co., Ltd., Seoul (KR)

(*) Notice: Subject to any disclaimer, the term of this patent is extended or adjusted under 35 U.S.C. 154(b) by 0 days.

(21) Appl. No.: 09/536,629

(22) Filed: Mar. 28, 2000

Related U.S. Application Data (63) Continuation of application No. 08/934,770, filed on Sep. 22, 1997.

(30) Foreign Application Priority Data

Sep. 23, 1996 (KR) .............................. 96-41779

(51) Int. Cl.$^7$ ................................. G02F 1/13
(52) U.S. Cl. ........................................ 349/141
(58) Field of Search ......................... 349/141

(56) References Cited

U.S. PATENT DOCUMENTS

| | | | |
|---|---|---|---|
| 4,239,346 A | 12/1980 | Lloyd | ............. 350/334 |
| 4,726,659 A | 2/1988 | Conrad et al. | ............. 350/341 |

(List continued on next page.)

FOREIGN PATENT DOCUMENTS

| | | | |
|---|---|---|---|
| EP | 0 368 260 A1 | 5/1990 | |
| EP | 0 588 568 A2 | 3/1994 | |
| EP | 0 749 029 A1 | 12/1996 | |
| JP | 60-158421 | 8/1985 | |
| JP | 62-078532 | 4/1987 | |
| JP | 04-067127 | 3/1992 | |
| JP | 06-160878 | 6/1994 | |
| JP | 06-273803 | 9/1994 | |
| JP | 7-36058 | 2/1995 | ............. 1/136 |
| JP | 07-134301 | 5/1995 | |
| JP | 7-225388 | 8/1995 | |
| JP | 08-062586 | 3/1996 | |
| JP | 09-005763 | 1/1997 | |
| JP | 09-005764 | 1/1997 | |
| JP | 09-005793 | 1/1997 | |
| JP | 09-033946 | 2/1997 | |
| JP | 09-043589 | 2/1997 | |
| JP | 09-043590 | 2/1997 | |
| JP | 09-101538 | 4/1997 | |
| JP | 09-105908 | 4/1997 | |
| JP | 9-106918 | 4/1997 | |
| JP | 09-258269 | 10/1997 | |
| JP | 09-269507 | 10/1997 | |
| JP | 09/325346 | 12/1997 | |
| KR | 96-32049 | 9/1996 | |
| KR | 97-22458 | 5/1997 | |
| KR | 98-040330 | 8/1998 | |
| WO | WO97/10530 | 3/1997 | |

OTHER PUBLICATIONS

M. Oh–e, et al. "S23–1 Principles and Characteristics of Electro–Optical Behaviour with In–Plane Switching Mode" Asia Display '95, pp. 577–580.

(List continued on next page.)

*Primary Examiner*—James A. Dudek
(74) *Attorney, Agent, or Firm*—Morgan, Lewis & Bockius LLP (57) ABSTRACT

A liquid crystal display device includes a first substrate including a plurality of data bus lines, a plurality of gate bus lines, and a plurality of thin film transistors at cross points of the plurality gate bus lines and the plurality of gate bus lines; a second substrate including a color filter layer; at least one shielding layer for shielding an outer induced electric field; and a liquid crystal layer sandwiched between the first substrate and the second substrate.

28 Claims, 6 Drawing Sheets

U.S. PATENT DOCUMENTS

| | | | |
|---|---|---|---|
| 5,307,189 A | 4/1994 | Nishiki et al. | 359/59 |
| 5,321,535 A | 6/1994 | Ukai et al. | 359/55 |
| 5,459,596 A | 10/1995 | Ueda et al. | 359/59 |
| 5,464,669 A | 11/1995 | Kang et al. | 438/359 |
| 5,464,705 A | 11/1995 | Wainwright | 429/61 |
| 5,492,762 A | 2/1996 | Hirai et al. | 428/447 |
| 5,576,858 A | 11/1996 | Ukai et al. | 359/59 |
| 5,598,285 A | 1/1997 | Kondo et al. | 349/39 |
| 5,600,464 A | 2/1997 | Ohe et al. | 349/123 |
| 5,602,662 A | 2/1997 | Rosenblatt et al. | 349/130 |
| 5,608,556 A | 3/1997 | Koma | 349/143 |
| 5,686,019 A | 11/1997 | Nakamura | 252/299.01 |
| 5,686,109 A | 11/1997 | Fujitsu et al. | 424/464 |
| 5,737,051 A | 4/1998 | Kondo et al. | 349/141 |
| 5,742,369 A | 4/1998 | Mihara et al. | 349/123 |
| 5,745,207 A | 4/1998 | Asada et al. | 349/141 |
| 5,757,455 A | 5/1998 | Sugiyama et al. | 349/129 |
| 5,760,856 A | 6/1998 | Yanagawa et al. | 349/42 |
| 5,760,857 A | 6/1998 | Yanagawa et al. | 349/43 |
| 5,786,876 A | 7/1998 | Ota et al. | 349/42 |
| 5,793,459 A | 8/1998 | Toko | 349/128 |
| 5,831,701 A | 11/1998 | Matsuyama et al. | 349/110 |
| 5,841,499 A | 11/1998 | Baur et al. | 349/141 |
| 5,852,485 A | 12/1998 | Shimada et al. | 349/141 |
| 5,859,682 A | 1/1999 | Kim et al. | 349/124 |
| 5,870,160 A * | 2/1999 | Yanagawa et al. | 349/141 |
| 5,886,762 A | 3/1999 | Lee et al. | 349/141 |
| 5,907,380 A | 5/1999 | Lien | 349/141 |
| 5,910,271 A | 6/1999 | Ohe et al. | 252/299.01 |
| 5,914,762 A | 6/1999 | Lee et al. | 349/141 |
| 5,946,067 A | 8/1999 | Kim et al. | 349/141 |
| 5,956,111 A | 9/1999 | Ohta et al. | 349/141 |
| 5,959,708 A | 9/1999 | Lee et al. | 349/143 |
| 5,969,782 A | 10/1999 | Lee et al. | 349/141 |
| 5,977,562 A | 11/1999 | Hirakata et al. | 257/72 |
| 5,995,186 A | 11/1999 | Hiroshi | 349/141 |
| 6,005,650 A | 12/1999 | Kim et al. | 349/130 |
| 6,040,887 A | 3/2000 | Matsuyama et al. | 349/141 |

OTHER PUBLICATIONS

S.H. Lee, et al. "Hi–Transmittance, Wide–Viewing–Angle Nematic Liquid Crystal Display Controlled by Fringe–Field Switching" Asia Display '98 pp. 371–374.

M. Ohta, et al., *S30–2 Development of Super–TFT–LCDs with In–Plane Switching Display Mode*, Asia Display 95, p. 707, 1995.

R. Kiefer, et al., *P2–30 In–Plane Switching of Nematic Liquid Crystals*, Japan Display 92, p. 547, 1992.

H. Wakemoto, et al. 38.1: An Advanced In–Plane–Switching Mode TFT–LCD, SID 97 Digest pp. 929–932.

S. Matsumoto, et al. LP–A: Display Characteristics of In–Plane–Switching (IPS) LCDs and a Wide–Viewing–Angle 14.5–in. IPS TFT–LCD, Euro Display '96 pp. 445–448.

* cited by examiner

LIQUID CRYSTAL DISPLAY DEVICE

This application is a continuation of 08/934,770 filed Sep. 22, 1997 and claims the benefit of Korean Application No. 1996-41779, filed on Sep. 23, 1996, which is hereby incorporated by reference.

BACKGROUND OF THE INVENTION

1. Field of the Invention

The present invention relates to a liquid crystal display device, and more particularly, to a liquid crystal display device having a good image quality and yield.

2. Discussion of the Related Art

Recently, thin film transistor liquid crystal display devices (TFT LCD) have been used as display devices for portable televisions and notebook computers, etc. However, the conventional TFT LCDs have angular dependence problems.

In order to overcome this angular dependence problem, a twisted nematic LCD having an optical compensation plate and a multi-domain LCD has been introduced. However, since the contrast ratio in these LCDs is dependent upon the viewing angle, the color of the image is shifted.

Figure 1:
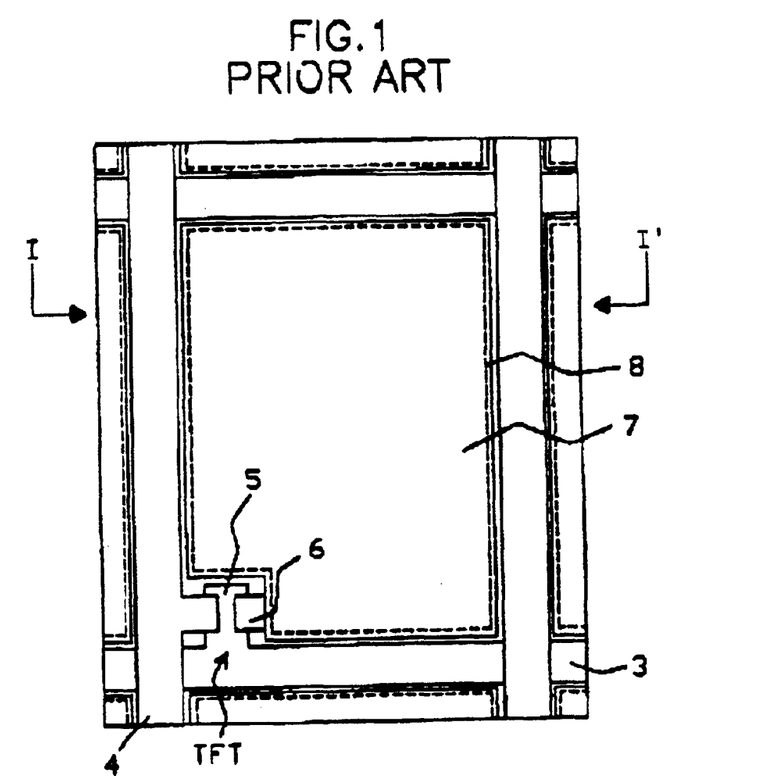
FIG. 1 is a plan view of a conventional liquid crystal display device.

FIG. 1 is a plan view of a conventional liquid crystal display device. As shown in FIG. 1, a pixel is defined by a gate bus line 3 and a data bus line 4. Although only one pixel is drawn in FIG. 1, the real liquid crystal display device has a plurality of pixels. At the intersection point between the gate bus line 3 and the data bus line 4, a thin film transistor (TFT) is located with a gate electrode 5 connected to the gate bus line 3 and source/drain electrodes 6 connected to the data bus line 4.

Figure 2:
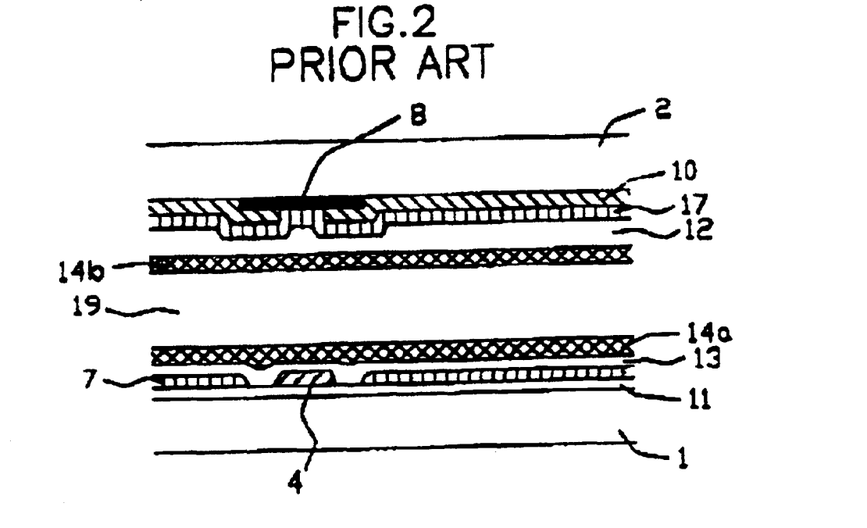
FIG. 2 is a sectional view taken long the line I–I' of FIG. 1.

FIG. 2 is a sectional view taken along the line I–I' of FIG. 1. The LCD includes a TFT array substrate 1 and a color filter substrate 2. As shown in FIG. 2, the data bus line 4 and a transparent pixel electrode 7 are formed on an insulating layer 11 deposited over the TFT array substrate 1, with a passivation layer 13 and a first alignment layer 14a formed thereon. On the color filter substrate 2, a color filter layer 10, and a black matrix 8 for preventing the light leakage through the TFT, the gate bus line 3, and the data bus line 4, are formed. A transparent counter electrode 17 is also formed over the color filter substrate 2, and a passivation layer 12 is deposited thereon. A second alignment layer 14b is coated on the passivation layer 12.

When a voltage is not applied to the pixel and the counter electrode 17 and the pixel electrode 7, the liquid crystal molecules in a liquid crystal layer 19 sandwiched between the TFT array substrate 1 and the color filter substrate 2 are arranged along the alignment direction of the first and second alignment layers 14a and 14b. By applying a voltage, an electric field is generated between the pixel electrode 7 and the counter electrode 17, so that the liquid crystal molecules are arranged perpendicular to the surface of the substrates 1 and 2. Thus, the angular dependence problem is generated because of the refractive anisotropy of the liquid crystal molecules, and the color is shifted.

To obtain a wide viewing angle, in-plane switching.LCDs are disclosed in JAPAN DISPLAY 92 (P547), Japanese Patent Unexamined Publication No. 7-36058, Japanese Patent Unexamined Publication No. 7-225538, and ASIA DISPLAY 95 (P707).

Figure 3:
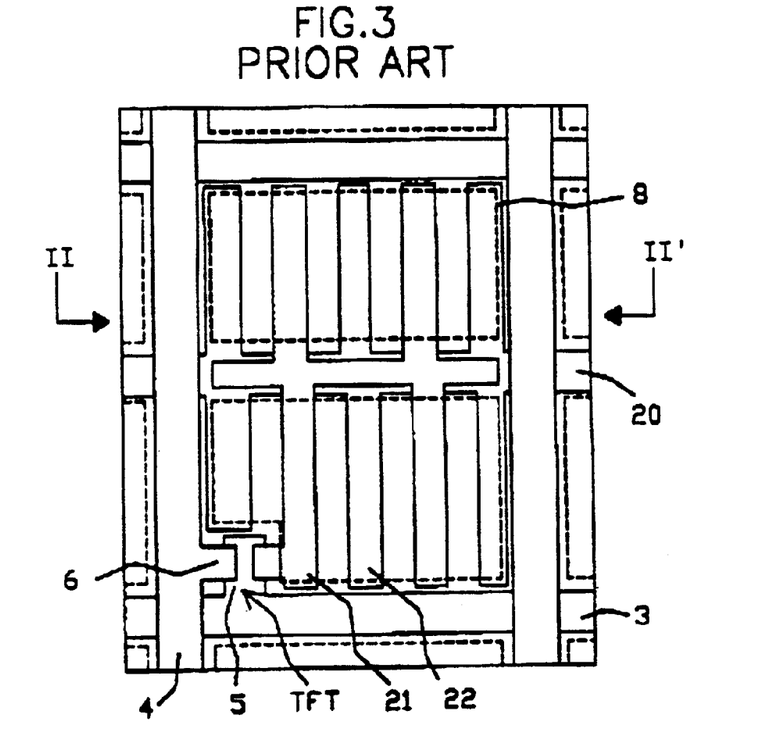
FIG. 3 is a plan view of a conventional in-plane switching liquid crystal display device.
Figure 4:
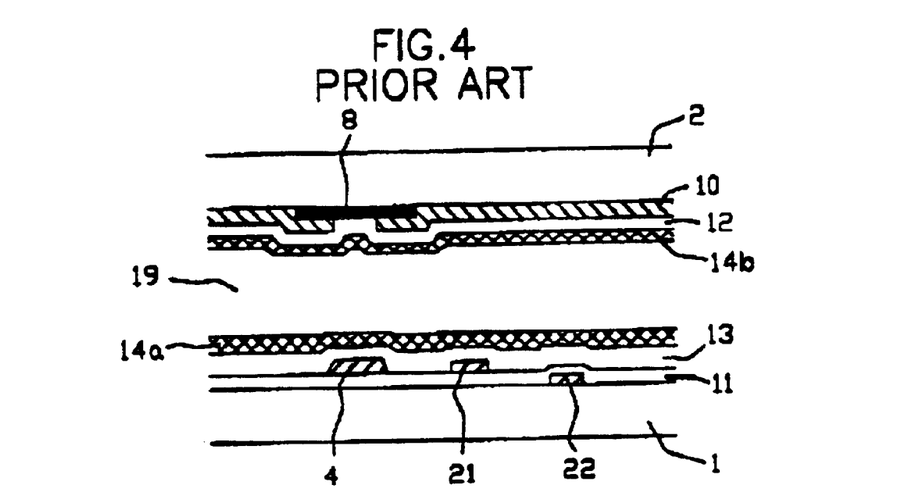
FIG. 4 is a sectional view taken along the line II–II' of FIG. 3.

FIGS. 3 and 4 illustrate a conventional in-plane switching liquid crystal display device. First and second alignment layers 14a and 14b are rubbed in a slightly oblique direction relative to the extension direction of the data bus line 4 to align the liquid crystal molecules in a certain direction. A polarizer (not shown in the drawing) having a polarization axis parallel to the extension direction of the gate bus line 3 is attached to the TFT array substrate 1 and an analyzer having a polarization axis parallel to the rubbing direction is attached to the color filter substrate 2. In the pixel, at least one data electrode 21 and one common electrode 22 are extended in the perpendicular direction to the extension direction of the gate bus line 3. When the voltage is not applied to the data electrode 21 and the common electrode 22, the liquid crystal molecules of the liquid crystal layer 19 are aligned in the slightly oblique direction relative to the extension direction of the electrodes 21 and 22 along the rubbing direction. When the voltage is applied, an electric field parallel to the extension direction of the gate bus line 3 is generated in the liquid crystal layer 19 to switch the liquid crystal molecules in the plane level of the surfaces of the substrates 1 and 2. Accordingly, the viewing angle characteristics and the contrast ratio are improved because of the in-plane switching of the liquid crystal molecules.

However, there are several problems in the conventional in-plane switching liquid crystal display device. The liquid crystal molecules are easily polarized by an outer induced electric field. Especially, the liquid crystal molecules in the liquid crystal layer are mainly polarized by the outer induced electric field through the color filter substrate during an user's application. The most general outer induced electric field is a field caused by a human hand approaching the screen. The electrostatic charges associated with the human hand cause the polarization of the liquid crystal molecules. As a result, a spot is generated on the screen.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device having a transparent conductive metal layer formed in the TFT array substrate and/or the color filter substrate to prevent the polarization of the liquid crystal molecules caused by an outer induced electric field.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, the liquid crystal display device of the present invention includes a thin film transistor array substrate, a color filter substrate, a shielding layer formed in the at least one substrate of the thin film transistor array substrate and the color filter substrate for shielding the outer induced electric field, and a liquid crystal layer formed between the thin film transistor array substrate and the color filter substrate.

The shielding layer includes the transparent conductive metal layer to prevent the polarization of the liquid crystal molecules caused by the outer induced electric field.

The thin film transistor substrate includes a first substrate, a plurality of gate bus lines and data bus lines defining a plurality of pixel region over the first substrate, a plurality of thin film transistor at the cross of the gate bus lines and the data bus lines, at least one pair of electrodes including a data electrode and a common electrode perpendicular to the gate bus lines in the pixel region, a passivation layer over the first substrate, and a first alignment layer on the passivation layer. The color filter substrate includes a second substrate, a black matrix on the second substrate, a color filter layer on the second substrate and the black matrix, the passivation layer over the second layer, and a second alignment layer on the passivation layer.

The transparent conductive metal layer is formed at the inner surface of the first substrate facing the liquid crystal layer or the outer surface. Further, the transparent conductive metal layer can be formed at the inner surface of the second substrate, the outer surface, or on the shielding layer. In addition, the transparent conductive metal layer can be formed in both substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
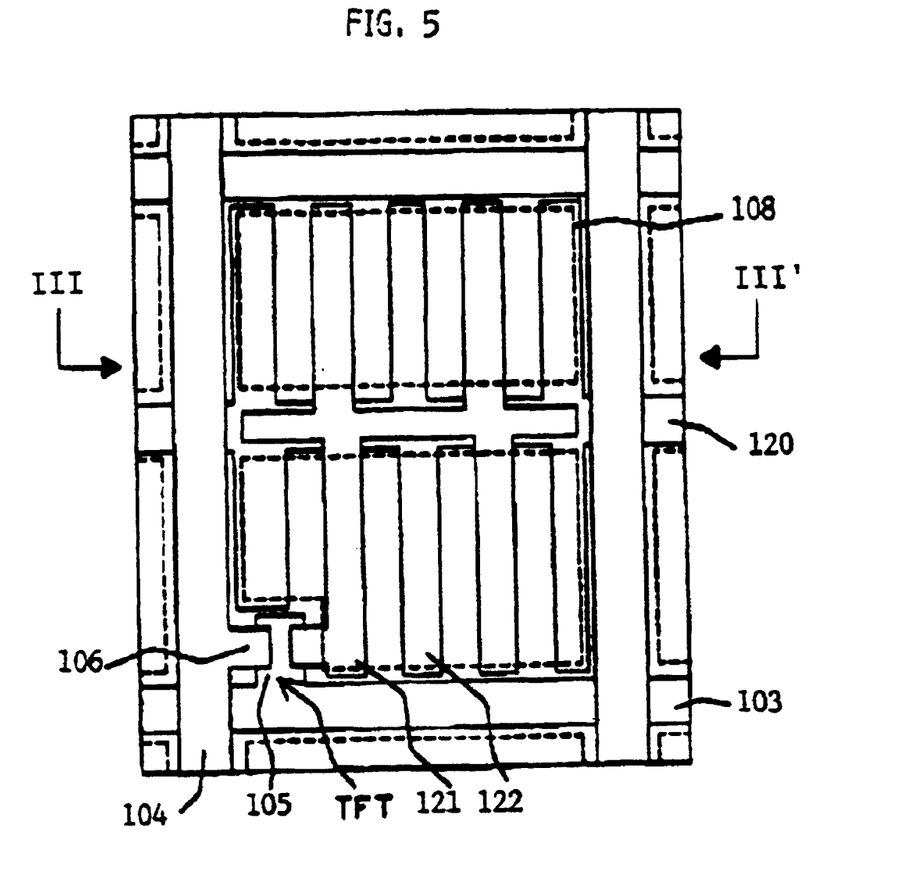
FIG. 5 is a plan view of the in-plane switching liquid crystal display device according to the present invention.

One feature of the present invention is the transparent conductive metal layer formed at the TFT array substrate and/or the color filter substrate. FIGS. 6–11 are views taken along the line III–III' of FIG. 5 indicating the elements similar to those in the conventional in-plane switching liquid crystal display device, as well as the new elements of the present invention such as the transparent conductive metal layer.

Figure 6:
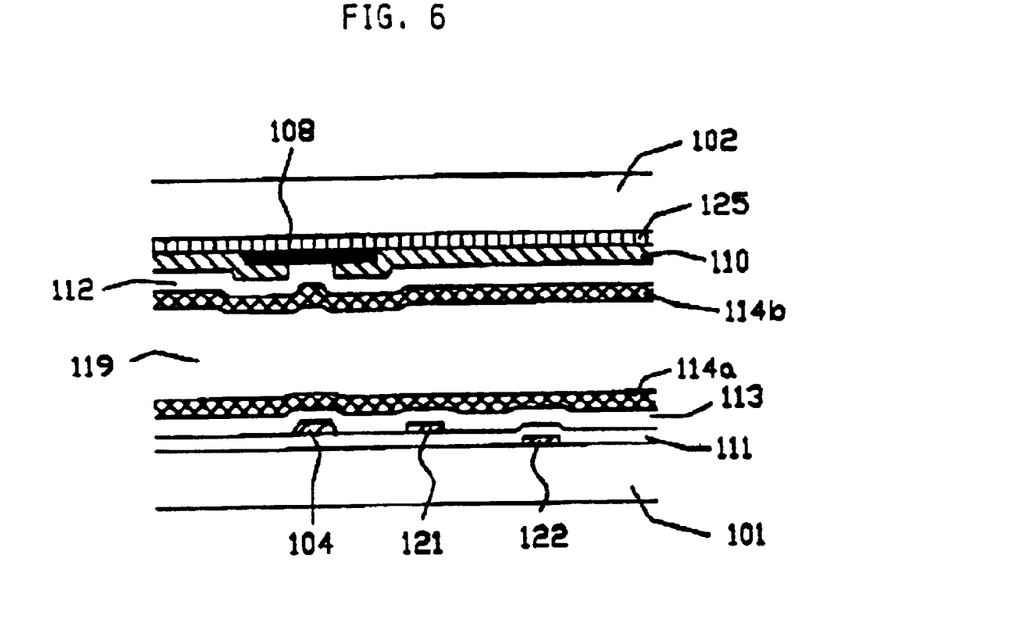
FIG. 6 is a sectional view of the in-plane switching liquid crystal display device according to a first embodiment of the present invention.

FIG. 6 is a sectional view showing a first embodiment of the present invention. As show in FIGS. 5 and 6, a plurality of gate bus lines 103 and data bus lines 104 are formed on the first substrate 101 (TFT array substrate). At the cross points of the gate bus lines 103 and the data bus lines 104, a plurality of thin film transistor are arranged. A common bus line 120 parallel to the gate bus line 103 is formed in the pixel region. Also in the pixel region, at least one common electrode 122 connecting to source/drain electrodes 106 of the TFT is extended in the parallel direction of the extension direction of the data bus line 104, and an insulating layer 111 is deposited thereon. A common electrode 122 is formed by etching a sputtered metal layer such as Cr, Mo, Al, and Al alloy. The insulating layer 111 such as SiOx and SiNx is deposited by a plasma chemical vapor deposition (CVD) process.

On the insulating layer 111, the data bus line 104 and the data electrode 121 are formed by etching the sputtered metal layer such as Cr, Mo, Al, and Al alloy. The insulating layer 111, the data bus line 104, and the data electrode 121 are covered with a passivation layer 113 such as SiOx and SiNx by the plasma CVD process, and an alignment material including polyimide is coated thereon to form a first alignment layer 114a.

The polyimide layer must be rubbed by the rubbing cloth to form the alignment direction. The resultant electrostatic discharge and the dust may cause damages to the substrates. In order to overcome such damages, the photo-alignment materials such as polysiloxane-based materials or polyvinylfluorocinnamate (PVCN-F) can be used as the alignment materials.

A transparent conductive metal layer 125 such as indium tin oxide is formed on the second substrate 102 (color filter substrate) by a sputtering process and a black matrix 108 is formed thereon. The black matrix 108 is formed by etching Cr layer or CrOx layer to prevent the leakage of the light through the data bus line 104, the gate bus line 103, the common bus line 120, and the TFT. A color filter layer 110 is formed on the black matrix 108 and the transparent conductive metal layer 125. A passivation layer 112 including SiOx and SiNx is deposited on the color filter layer 110 by the plasma CVD process and a second alignment layer 114b including the polyimide, polysiloxane based materials, and the PVCN-F, is coated thereon.

Between the first and second substrates 101 and 102, spacers (not shown in the drawing) are scattered to assure an uniform interval between the first and second substrates. The liquid crystal layer 119 is sandwiched between the first and second substrates 101 and 102.

In the liquid crystal display device of the present invention, a pair of electrodes 121 and 122 apply and electric field to the liquid crystal layer 119 to switch the liquid crystal molecules in the plane level of the surface of the substrate 101.

The transparent conductive metal layer 125 shields the outer induced electric field caused by electrostatic discharge. That is, when a human hand approaches the screen, charges are induced in the transparent conductive metal layer 125 because of the electrostatic discharge of the hand. This induced discharge flows out the liquid crystal panel through the transparent conductive metal layer 125, so that the device is shielded from the outer induced electric field.

Figure 7:
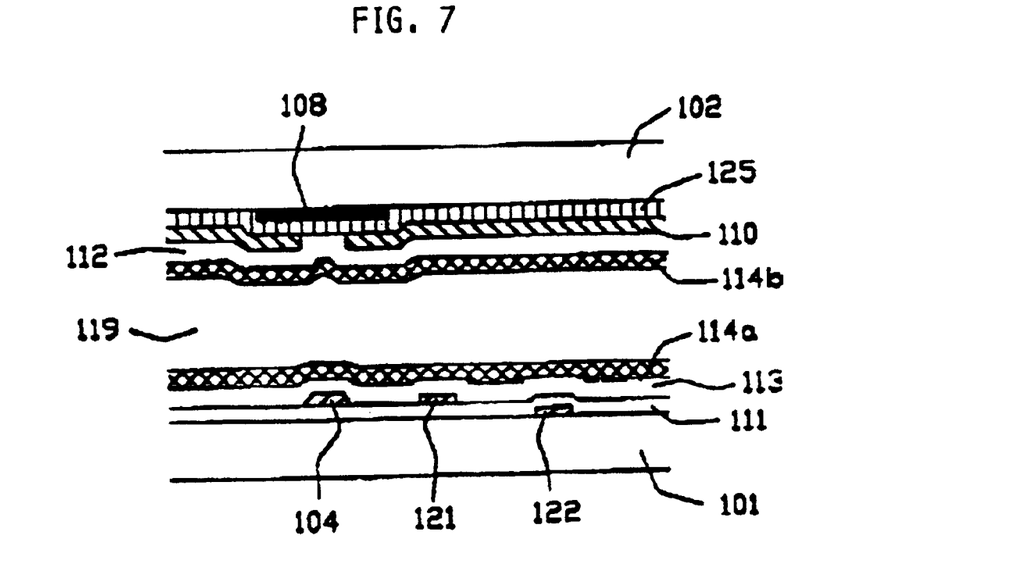
FIG. 7 is a sectional view of the in-plane switching liquid crystal display device according to a second embodiment of the present invention.

FIG. 7 is a sectional view showing a second embodiment of the present invention. In this embodiment, the structure is the same as that of the first embodiment except the position of the transparent conductive metal layer 125. Over the first substrate 101, as shown in FIG. 7, the data and the gate bus lines 103 and 104, the TFT, the data and common electrodes 121 and 122, and the first alignment layer 114a are formed. Over the second substrate 102, the black matrix 108, the transparent conductive metal layer 125, the color filter layer 110, and the second alignment layer 114a are formed. The black matrix 108 is directly on the second substrate 102 and the transparent conductive metal layer 125 is formed on the black matrix 108 and the second substrate 102. In this embodiment, the transparent conductive metal layer 125 similarly shields the outer induced electric field.

Figure 8:
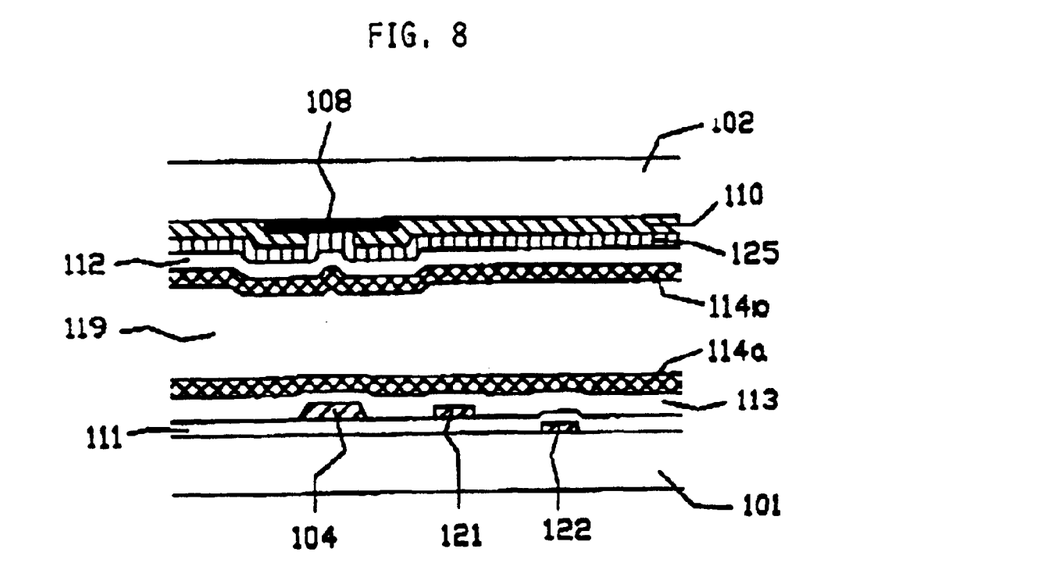
FIG. 8 is a sectional view of the in-plane switching liquid crystal display device according to a third embodiment of the present invention.

FIG. 8 is a view illustrating the third embodiment of the present invention. In this embodiment, the transparent conductive metal layer 125 is formed on the color filter layer 110 of the second substrate 102.

Figure 9:
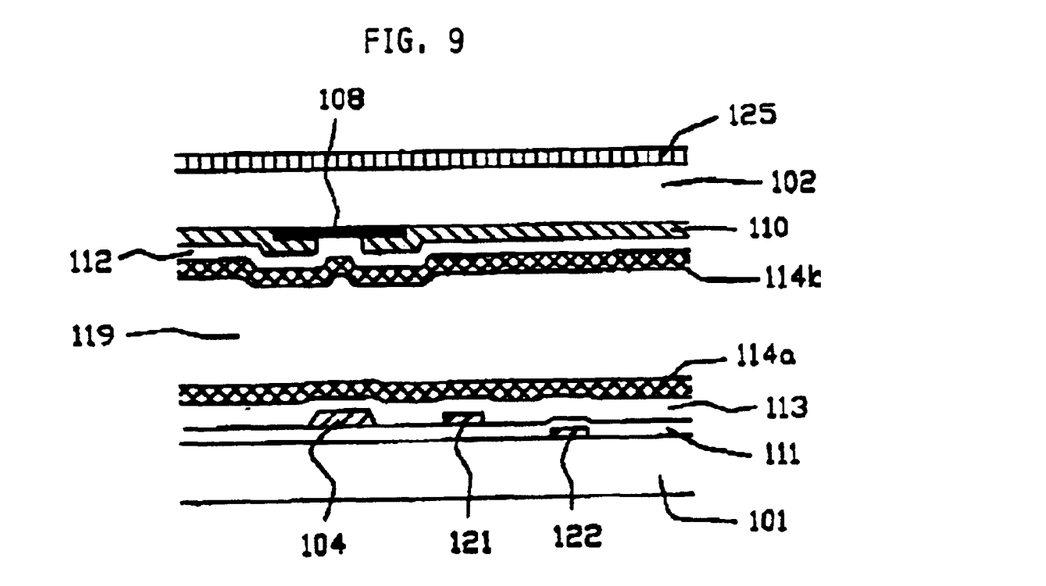
FIG. 9 is a sectional view of the in-plane switching liquid crystal display device according to a fourth embodiment of the present invention.

FIG. 9 is a view illustrating the fourth embodiment of the present invention. The difference from the first embodiment is that the transparent conductive metal layer 125 is formed out of the second substrate 102. The same effect as that of the first and second embodiments is obtained. Since the transparent conductive metal layer 125 can be formed after assembling the first and second substrates, the manufacturing process can be simplified.

Practically, the image-presenting substrate is the second substrate 102, i.e., the color filter substrate. Thus, the liquid crystal molecules are mainly polarized by the outer induced electric field through the color filter substrate. During the liquid crystal manufacturing process, however, other processes are needed after sealing the liquid crystal panel. These other processes generate an outer induced electric field and this induced field polarizes the liquid crystal molecules through the first substrate 101, i.e., the TFT array substrate. To overcome this problem, a transparent conductive metal layer 125 located near the TFT array substrate is needed.

Figure 10:
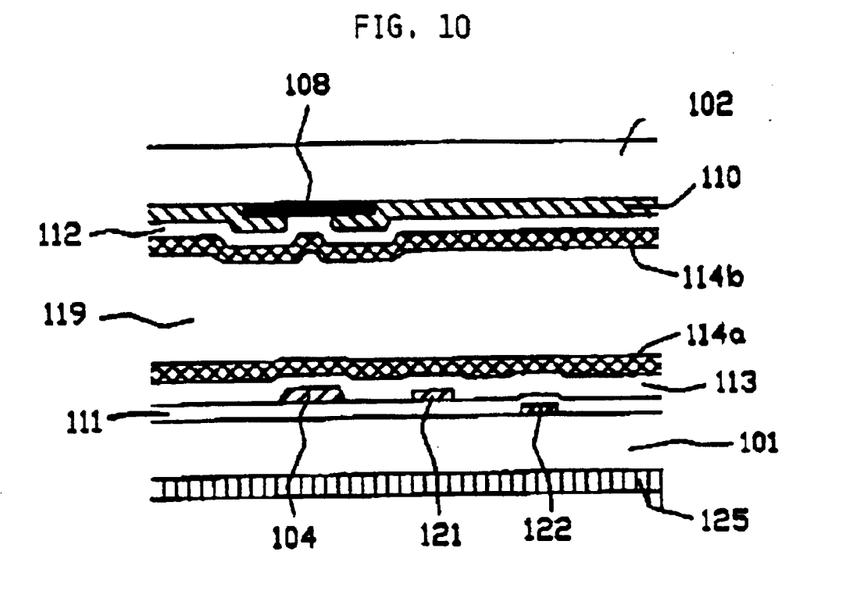
FIG. 10 is a sectional view of the in-plane switching liquid crystal display device according to a fifth embodiment of the present invention.
Figure 11:
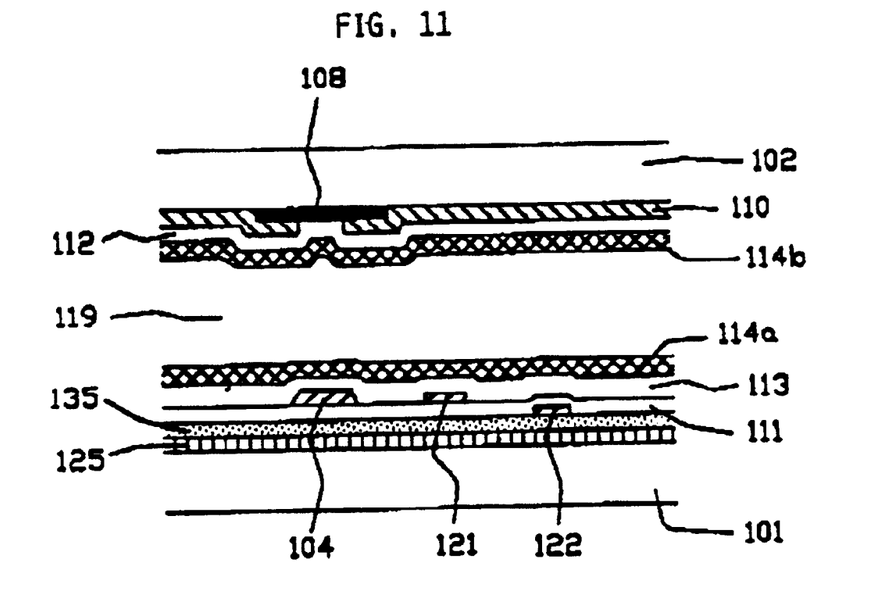
FIG. 11 is a sectional view of the in-plane switching liquid crystal display device according to a sixth embodiment of the present invention.

FIGS. 10 and 11 are views indicating the fifth and sixth embodiments of the present invention. In these embodiments, the transparent conductive metal layer 125 are formed near the TFT array substrate. As shown in FIGS. 10 and 11, the transparent conductive metal layer 125 is formed either at the inner surface or at the outer surface of the first substrate 101 to shield the outer induced electric field. When the transparent conductive metal layer 125 is formed in the inner surface of the first substrate 101, as shown in FIG. 11, the insulating layer 135 must be formed between the transparent conductive metal layer 125 and the common electrode 122 to prevent the short circuit therebetween.

Although for the illustration purpose, the transparent conductive metal layer 125 is formed only in the TFT array substrate or the color filter substrate in the above embodiments, it is preferred to form the transparent conductive metal layer 125 in both substrates.

When the transparent conductive metal layer 125 is formed in both substrates, the positioning of the first through the fourth embodiments and that of the fifth and sixth embodiments are combined. That is, the transparent conductive metal layer 125 may be formed in the outer surface of the first and second substrates 101 and 102, in the inner surface of the first and second substrates 101 and 102, in the outer surface of the first substrate 101 and on the black matrix 108 of the second substrate 102, in the outer surface of the first substrate 101 and on the color filter layer 110 of the second substrate 102, in the inner surface of the first substrate 101 and outer surface of the second substrate 102, in the inner surface of the first substrate 101 and on the color filter layer 110 of the second substrate 102, and other possible combinations.

As described above, since the present liquid crystal display device includes the transparent conductive metal layer for shielding the outer induced electric field, spots are not generated on the screen. As a result, the liquid crystal display device has a better image quality.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate including a plurality of data bus lines, a plurality of gate bus lines, and a plurality of thin film transistors at cross points of the plurality of data bus lines and the plurality of gate bus lines;
   a second substrate including a color filter layer;
   a liquid crystal layer over the first substrate to apply an electric field to the liquid crystal layer parallel to surfaces of the first and second substrates; and
   a shielding layer on an outer surface of the second substrate, said shielding layer for shielding an outer electric field.

2. The device according to claim 1, wherein said shielding layer includes a transparent conductive metal layer.

3. The device according to claim 2, wherein the transparent conductive metal layer includes indium tin oxide.

4. The device according to claim 1, further comprising a pair of electrodes over the first substrate.

5. The device according to claim 4, wherein the pair of electrodes are formed a parallel electric fields of the first and second substrates.

6. The device according to claim 1, further comprising:
   a passivation layer on the first substrate;
   a first alignment layer on the passivation layer; and
   a second alignment layer on the color filter layer.

7. The device according to claim 6, wherein the first alignment layer includes a polyimide.

8. The device according to claim 6, wherein the first alignment layer includes a photo-alignment material.

9. The device according to claim 8, wherein the photo-alignment material includes a polyvinylfluorocinnamate.

10. The device according to claim 8, wherein the photo-alignment material includes polysiloxane-based materials.

11. The device according to claim 6, wherein the second alignment layer includes a polyimide.

12. The device according to claim 6, wherein the second alignment layer includes a photo-alignment material.

13. The device according to claim 12, wherein the photo-alignment material includes a polyvinylfluorocinnamate.

14. The device according to claim 12 wherein the photo-alignment material includes polysiloxane-based materials.

15. A method of fabricating a liquid crystal display device, comprising the steps of:
   forming a plurality of data bus lines and a plurality of gate bus lines on a first substrate;

forming a plurality of thin film transistors at cross points of the plurality of data bus lines and the plurality of gate bus lines;

forming a shielding layer on an outer surface of a second substrate, said shielding layer for shielding an outer electric field;

forming a color filter layer on the second substrate; and forming a liquid crystal layer between the first and second substrates, the liquid crystal layer being applied in electric field parallel to surfaces of the first and second substrates.

16. The device according to claim 15, wherein said shielding layer includes a transparent conductive metal layer.

17. The device according to claim 16, wherein the transparent conductive metal layer include indium tin oxide.

18. The device according to claim 15, further comprising the step of forming a pair of electrodes over the first substrate.

19. The device according to claim 18, wherein the pair of electrodes are formed a parallel electric fields of the first and second substrates.

20. The device according to claim 15, further comprising;

a passivation layer on the first substrate;

a first alignment layer on the passivation layer, and a second alignment layer on the color filter layer.

21. The device according to claim 20, wherein the first alignment layer includes a polyimide.

22. The device according to claim 20, wherein the first alignment layer includes a photo-alignment material.

23. The device according to claim 22, wherein the photo-alignment material includes a polyvinylfluorocinnamate.

24. The device according to claim 22, wherein the photo-alignment material includes polysiloxane-based materials.

25. The device according to claim 20, wherein second alignment layer includes a polyimide.

26. The device according to claim 20, wherein the second alignment layer includes a photo-alignment material.

27. The device according to claim 26, wherein the photo-alignment material includes a polyvinylfluorocinnamate.

28. The device according to claim 26, wherein the photo-alignment material includes polysiloxane-based materials.

* * * * *